May 9, 1944.  E. R. BOYLES ET AL  2,348,278
APPARATUS FOR FORMING COMBINATION CURVED AND STRAIGHT GLASS
Filed Dec. 26, 1940
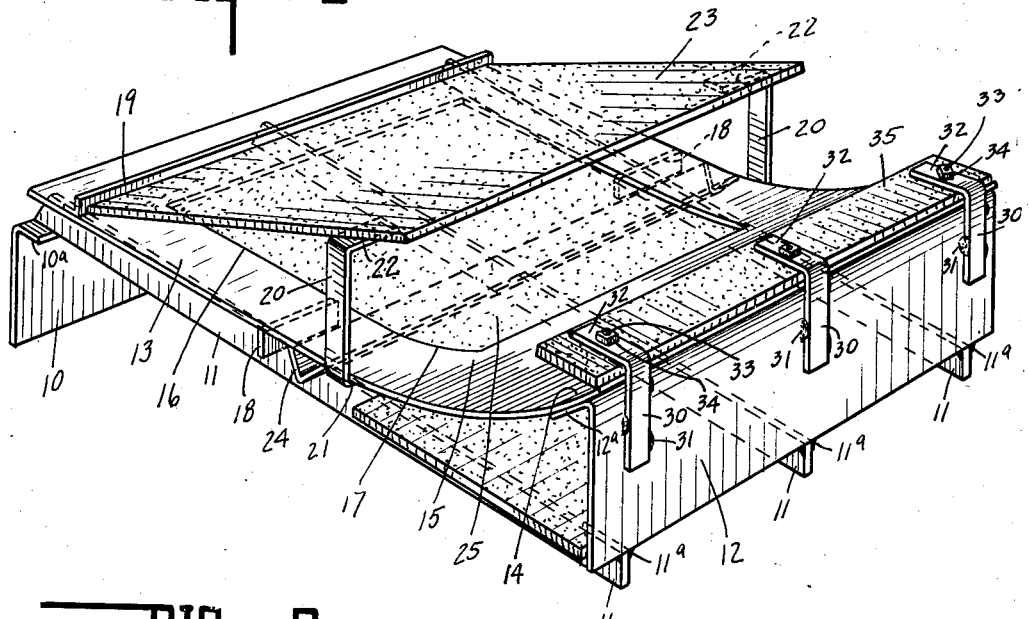
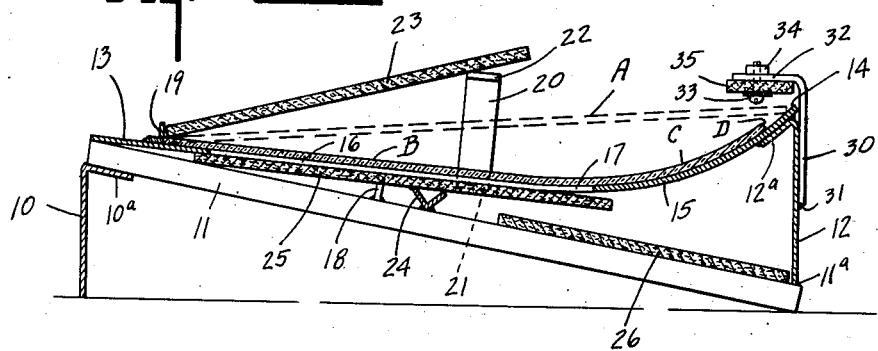
INVENTORS.
CLARENCE M. PATTISON,
EDGAR R. BOYLES,
BY Lockwood, Goldsmith & Galt,
ATTORNEYS.

Patented May 9, 1944

2,348,278

UNITED STATES PATENT OFFICE 2,348,278

APPARATUS FOR FORMING COMBINATION CURVED AND STRAIGHT GLASS

Edgar R. Boyles and Clarence M. Pattison, Hartford City, Ind., assignors to The Johnston Glass Co., Inc., Hartford City, Ind., a corporation Application December 26, 1940, Serial No. 371,702

5 Claims. (Cl. 49—67)

This invention relates to apparatus for bending sheet glass for a variety of uses.

The apparatus herein, however, may be utilized for the bending of single sheets of glass or the simultaneous bending of a plurality of sheets of glass when curved laminated glass structures are to be fabricated.

No claim is made herein to methods of fabricating safety glass but it is pointed out that the present apparatus produces a plurality of glass layers suitable for safety glass formation of curved or bent character which have confronting surfaces that are substantially complementary throughout their entire area regardless of curvature or curvatures whereby a uniform thickness of plastic material may be utilized therebetween, thereby forming a composite safety glass sheet of bent or curved character which is of uniform thickness throughout and hence, is not subject to variation in strains and stresses incident to variation, lack of contact between surfaces, et cetera, well known in the laminated or safety glass industry.

The present invention contemplates the formation of bent sheet glass which is capable of utilization with thin sheets of glass with the same facility as heavier sheets of glass.

The present invention also lends itself to the expeditious and continuous production of bent glass.

The molds utilized in the present invention are of such a character that they heat up approximately at the same rate as the glass and they cool off at substantially the same rate and one suitable form of mold is a sheet metal mold.

It also has been found that the smoother the surface of the mold the better the finish and ware obtained therefrom. The mold surface may be coated with any one of several well known materials.

In certain instances where temperature control can be very closely regulated and the molds can be mechanically cleaned and have a high polished surface, ware has been successfully produced, having the desired finish, without the use of any coating material whatsoever applied to the mold surface.

The molds preferably are of thin sheet metal tempered to withstand heating to a temperature sufficient to soften sheet glass. Temperatures sufficient to soften sheet glass vary from about 1,000° F. to 1,500° F., the operating range being approximately between 1,050° F. and 1,400° F. The thickness of the sheet and the kind of glass determines the softening point of that glass.

In utilizing the apparatus, the several molds after being properly cleaned and coated, have the glass applied thereto and glass and mold are approximately at room temperature, although from previous use the mold may be somewhat warmer, although this difference is insufficient to have any material effect on the glass or if the coating on the mold be of combustible character to cause or initiate combustion of that coating.

The glass and mold then are gradually subjected to increasing temperatures. The rate of heating is suitably controlled so that the mold and glass are gradually brought up to a temperature known as the softening temperature of that glass. When the glass has reached this temperature, it sags by its own weight and takes the shape of the metal mold and immediately after assuming that shape, the mold and bent glass are subjected to progressively cooler temperatures until the mold and glass are cool enough to handle without the use of tools.

The cooling period, of necessity, is of such duration that the glass in cooling will not have set up therein strains well known in the industry. In other words, the glass when cool has been annealed.

It will be appreciated that insofar as the present apparatus is concerned, when the molds are of concave character with reference to the glass supporting surface, the temperatures above and below the mold and glass can be approximately the same. When, however, the mold supporting surface is of convex character, it has been found the temperature above the mold and glass should be higher than the temperature below the mold and glass to facilitate expeditious conformance of the glass to the mold.

In order to retain the high polish in sheet glass, known as window glass, and in order to prevent burning of the surface, it is important that the temperature control be such that the glass and mold immediately start to cool after the glass has been softened and has conformed to the mold.

Furthermore, it is equally apparent that when thicker sheets than those first described, are being bent, higher temperatures may possibly be necessary.

All of the aforesaid applies to the bending or curving of a single sheet of glass or a plurality of sheets of glass and the annealing thereof. In the bending or curving of a plurality of sheets of glass, the following precautions are to be observed: The mold may be coated, as before, and the several sheets of glass are cleaned so that said sheets contain no dirt or fine particles or anything else which would mar the surface of that sheet or perhaps cause the sheets to adhere to each other. Then the two or more sheets of glass which are perfectly clean, are placed on the mold and subjected to heat in the manner indicated and subject to the controls and cautions previously described.

While all of the aforesaid description has been directed to the bending of glass in a concave and convex conformation, limited to one direction, it is to be understood that if the molds are shaped convex or concave in two transverse directions or include variations thereof, the resulting glass sheet or sheets when confromed thereto will have the complementary mold conformation.

One characteristic of the present invention is that the mold is of openwork, that is, of skeleton like character and by reason of the resulting openwork arrangement whereby the glass is exposed except where mold contacted, certain heat shielding means are provided, all as hereinafter more specifically pointed out in detail.

The foregoing apparatus is expeditious because when the glass mass is heated and the heat is properly controlled, a maximum of perfect ware is produced and at a minimum cost of production.

By way of illustration, apparatus suitable for practicing the process now will be described.

In the drawing in this application,

Fig. 1 is a perspective view of the mold structure apparatus embodied in the invention, the glass sheet being mounted thereon and shown in the bent formation substantially as it would appear when discharged or taken from the lehr.

Fig. 2 is a longitudinal sectional view of the same, the dotted lines therein illustrating the position of the flat glass sheet previous to bending.

It has been ascertained that in the bending of a sheet of flat glass or the simultaneous bending of a plurality of sheets of flat glass wherein only a portion of the glass is to be bent and the remainder is to retain its original flatness, that the flat glass portion, or portions, usually is in contact with the mold surface long enough to cause objectionable pitting or "burning." Such defects especially are objectionable in instances where the glass is intended for use in aeroplanes, lenses and the like.

The apparatus shown in Figs. 1 and 2 herein includes an angle plate 10 having a downwardly and inwardly directed ledge portion 10a and to the upper surface of which is suitably secured a plurality of spaced bars or beams 11. Herein three are shown—two near the ends of the angle plate 10 and one approximately midway thereof. The opposite ends of the angle parts have suitably secured thereto as by spot-welding, or the like, as at 11a, another angle plate 12 having a downwardly and inwardly directed portion 12a.

The sheet metal glass supporting and forming surface template includes the portion 13 suitably secured to the upper surface of the upper ends of the bars 11 and the other end 14 of said template is suitably secured to the downwardly and inwardly directed flange 12a, as shown. Herein the intermediate portion of said template is indicated by the numeral 15. There is provided an aperture 16 in the portion 13 and there is provided an aperture 17 in the portion 15. These two apertures preferably are continuations of each other and each constitutes an open-work arrangement. The flat portion 13 of the glass supporting surface metal member, it will be noted—see Fig. 2—gradually diverges from the bars 11 and is supported at one or more points by the reenforcements 18.

Adjacent the bar anchored end of the supporting surface member 13 there is suitably secured an angle member 19 which is parallel to the member 10 and constitutes a stop for both the glass sheet and a heat shield. Suitably secured to the underface of the glass sheet supporting member is a U-shaped member designated by the numeral 20, and having the lower inwardly directed portions 21 and the upper inwardly directed portion 22. These, if desired, may be supported by the bars 11. A indicates the flat glass sheet which is placed on the mold structure with one end the lower end bearing on the stop 19.

The upper end of the glass sheet and the opposite end bears on the portion 14 of the glass supporting surface. After this has been positioned, a heat shield is applied. Herein the same is shown as consisting of asbestos millboard. However, a metal shield or other shield may serve as well. It rests on the glass sheet A adjacent the stop 19 and by reason of the inclination of the shield, it bears against the stop 19 as well and is limited in movement thereby. The opposite end is supported by the inwardly directed portions 22 of the upstanding side members 20 and the sheet merely rests on the inwardly directed portions 22 of said upright members. These are not continued across and joined, since it facilitates flat glass sheet application and curved sheet removal following formation, if the heat shield 23 be removed preliminary to flat sheet application to the mold or curved sheet removal therefrom.

Extending across and suitably secured to the several bars 11 is an angle member 24. The upper edges thereof terminate in spaced relation to the metal sheet 13 and as shown in the figures, another heat shield 25 may be inserted between the flat sheet 13 and the bars in the construction of the mold and wedgingly secured therein, the wedging action being obtained near the upper end of the bars 11, as shown in Fig. 2. This shield 25, therefore, shields the glass which would normally be exposed through the opening or openwork formation 16 and partially shields but not entirely, the aperture or openwork formation 17. Also, if desired, and the same may or may not be employed, depending upon conditions, a heat shield 26 of the same general material may be positioned upon the bars 11 near the lower ends thereof and block rising heat currents.

With these two heat shields, it will be obvious that rising heat engaging the underface of the mold structure will pass upwardly along the underside of the shield 26 and thence pass inwardly between the two shields to engage the lower face of the curved portion 15 of the glass curved supporting portion. The glass sheet following formation is indicated by the letters B and C, B indicating the flat portion and C the curved portion. D indicates the free edge of the glass sheet remote from the flat portion A.

Whenever desired, there is provided a plurality of angular upright members 30 suitably secured as at 31 to the portion 12, and the inwardly directed portions 32 extend inwardly and above the angular portion 12a of the member 12 and the portion 14 of the glass supporting surface. A strip of heat shielding material 35 and of the character previously described, may be suitably suspended and secured to the inwardly directed portions 32 as by the bolt and nut means 33 and 34.

It will be readily apparent that the strip or supplementary shield 35 may be omitted or utilized whenever desired, and the sheet of heat shielding material 26 may be similarly employed or omitted whenever desired or required.

The glass sheet in its flat form is positioned on the mold as shown by the dotted lines—see Fig. 2—and indicated by A when the shield 23 has been removed and this may be readily effected because the glass can be slid upwardly on the portion 15 to seat the opposite end of the glass sheet to the right of the stop 19.

Thereafter the shield 23 is reapplied and then the mold and sheet are subjected to increasing temperatures until glass softening temperature occurs and when that is attained, the sheet sags and conforms to the glass supporting sheet or mold surface. The glass is not softened to the point where it will bulge or bag into the aperture or openwork conformation. The flat portion of the glass by reason of its upper and lower shielding arrangement, bodily lowers as the glass is softened at the bendable portion until it, in its original planar form, rests upon the flat portion of the glass supporting surface 13 and conforms thereto.

The shielding prevents the overheating of this glass portion so it will not bag or bulge into the openwork conformation and the peripheral or border support arrangement disclosed is sufficient to support the peripheral border of the glass to obtain the desired result, hence complete surface support of the glass is not required. This means that the surface of the glass not mold contacted is not pitted or burned. In this manner also the glass is shielded both above and below and throughout the area thereof, that is, to be retained flat and hence this flat area of the glass may be said to remain substantially cooler than the exposed portion.

The openwork skeleton like arrangement, it has been found, eliminates to a considerable degree the possibility of pitting and marking of the surface of the glass by reason of particles of dirt being interposed between the glass and the mold. Marginal support of the glass, therefore, has been found not only sufficient for the fabrication of curved glass having a flat portion but has the additional utility just described.

It, of course, will be understood that different types of bends will require more or less shielding in order to obtain the necessary temperature differences in the glass sheet and the present method is not confined solely to the treatment of bends where a portion of the sheet remains flat but also applies to the production of a sheet or complementary sheets wherein curvatures of more than one radius, such as an elliptical curve are included. By shielding selected portions of the glass sheet that are to remain flat, the desired end product can be obtained thus the central area of the sheet could be retained flat while both end were being bent or the ends could be retained flat and the central area bent.

The essence of the present apparatus, therefore, is controlling in the manner indicated, the temperature of the various areas of the sheet, or sheets, of glass to be bent, retaining certain portions of said sheet, or sheets, in a rigid state while other areas are heated sufficiently so that they will conform to the shape of the mold.

The shield material utilized and found satisfactory, has been about ¼" in thickness of asbestos millboard. Naturally, if a metal heat shield were employed, the thickness thereof would be materially less.

The term "openwork" as used in the description and claims, is intended to include a single opening as well as a plurality of adjacent openings.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A mold structure for bending substantially flat glass sheets to the desired contour including a base having a plurality of spaced beams rigidly connected together at opposite ends, a centrally apertured sheet-like template having the desired contoured glass sheet supporting surface and rigidly supported at its ends and intermediate same by said base, the major portion of the template being spaced from the beams, a glass sheet stop on the template, and heat shielding sheet means beneath the template and registering with and of greater area than the template aperture and supported by the beams immediately adjacent the template.

2. A structure as defined by claim 1 wherein the beams are inclined and a second sheet heat shielding means is supported by the beams below the first mentioned heat shielding means and offset therefrom, adjacent ends of both heat shielding means overlapping each other, although vertically spaced apart, and imperforate sheet-like support means carried by the beams and constituting the connection therebetween at one end, the sheet-like support means at its upper end supporting the adjacent end of the template.

3. A structure as defined by claim 1 wherein there is provided upwardly directed supports intermediate the ends of the structure and adjacent the sides thereof and having inwardly directed portions positioned appreciably above the template, and comparatively rigid, sheet-like, heat insulation means resting on said portions and abutting said stop and superposed relative to the template aperture.

4. A structure as defined by claim 1 wherein there is provided a plurality of upwardly directed members rigid with the base and at the end opposite the stop and having portions directed over the template, and sheet-like heat insulating means carried by said portions and positioned above the template.

5. A structure as defined by claim 1 wherein said heat shielding means is positioned adjacent the stop and extends in a general direction toward the opposite end of the template but terminating appreciably short thereof, said heat shielding means having an area at least as great as that of the template aperture, the beams being inclined, a second heat shielding means positioned below the said opposite end of the template and at a level appreciably below the first mentioned heat shielding means, the heat shielding means being of appreciably less length than that of the template, adjacent superposed spaced ends of both heat shielding means overlapping each other, imperforate means interposed between the said opposite end of the template and the end opposite the overlapping end of the second mentioned heat shielding means for forming a circuitous heating channel to the said opposite end of the template, a third heat shielding means supported in spaced relation to and above the template and extending from the stop toward but terminating appreciably short of the said opposite end of the template, and a fourth heat shielding means superposed relative to the said opposite end of the template and having its end, adjacent the adjacent end of the third heating shielding means, appreciably spaced therefrom for localizing heat application toward the template between the said adjacent appreciably spaced ends of the said third and fourth mentioned heat shielding means, the lower circuitous channel and the upper localized heat applications being coincident relative to the template.

EDGAR R. BOYLES.
CLARENCE M. PATTISON.